United States Patent [19]
Pierce

[11] Patent Number: 5,261,862
[45] Date of Patent: Nov. 16, 1993

[54] MULTIPLE SPEED TRANSAXLE FOR AUTOMOTIVE VEHICLES

[75] Inventor: Stanley L. Pierce, Northville, Mich.

[73] Assignee: Ford Motor Company, Dearborn, Mich.

[21] Appl. No.: 894,695

[22] Filed: Jun. 5, 1992

[51] Int. Cl.$^5$ .................. F16H 57/10; F16H 47/08
[52] U.S. Cl. .................. 475/275; 475/276; 475/200; 475/202
[58] Field of Search ............ 475/275, 276, 277, 278, 475/200, 202, 203, 204, 206

[56] References Cited

U.S. PATENT DOCUMENTS

| | | | |
|---|---|---|---|
| 3,255,643 | 6/1966 | Hause | 475/202 X |
| 3,446,095 | 5/1969 | Bookout | 475/66 |
| 3,491,621 | 1/1970 | Moan | 475/66 |
| 4,056,988 | 11/1977 | Kubo et al. | 475/66 |
| 4,224,837 | 9/1980 | Crosswhite | 475/56 |
| 4,346,622 | 8/1982 | Pierce | 475/56 |
| 4,368,649 | 1/1983 | Vahratian et al. | 475/66 |
| 4,418,585 | 12/1983 | Pierce | 475/66 |
| 4,452,099 | 6/1984 | Crosswhite | 475/66 |
| 4,454,786 | 6/1984 | Stockton | 475/54 |
| 4,607,541 | 8/1986 | Miura et al. | 475/148 |
| 4,624,154 | 11/1986 | Kraft et al. | 475/66 |
| 4,638,686 | 1/1987 | Lemieux et al. | 475/55 |
| 4,722,242 | 2/1988 | Miura et al. | 475/205 |
| 4,841,804 | 6/1989 | Miura et al. | 475/66 |
| 4,938,097 | 7/1990 | Pierce | 475/72 |
| 4,963,124 | 10/1990 | Takahashi et al. | 475/276 X |
| 5,039,305 | 8/1991 | Pierce | 475/200 X |
| 5,069,656 | 12/1991 | Sherman | 475/276 |
| 5,167,593 | 12/1992 | Pierce | 475/276 X |

Primary Examiner—Rodney H. Bonck
Assistant Examiner—Daniel Wittels
Attorney, Agent, or Firm—Frank G. McKenzie; Roger L. May

[57] ABSTRACT

An automatic transaxle includes a torque converter, three planetary gear units, friction clutches and brakes, various overrunning couplings and a chain sprocket wheel integrally formed with the ring gear of one of the gear units. The sprocket wheel forms a torque transfer mechanism between the axis of the torque converter and a parallel axis, about which is located a differential mechanism, half shafts connected to side bevel gears of the differential, and final drive gearing located between the chain drive mechanism and the differential.

17 Claims, 6 Drawing Sheets

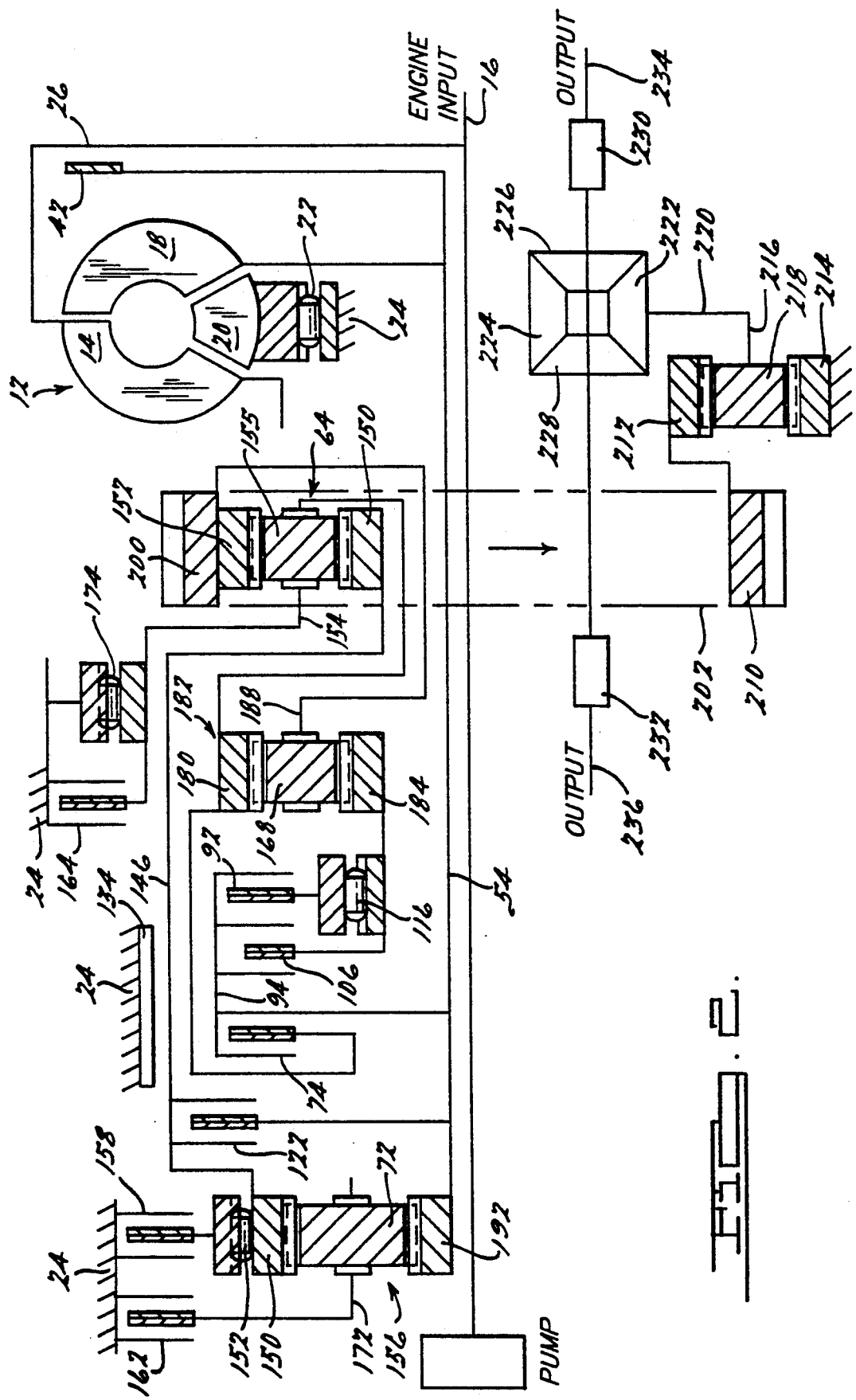

| GEAR | RC 122 | CC 106 | FC 92 | DC 74 | L/R 164 | 2B 134 | 4B 158 | 5B 162 | OWC3 156 DR | OWC3 156 CO | OWC2 116 DR | OWC2 116 CO | OWC1 174 DR | OWC1 174 CO | COAST BRAK'G |
|---|---|---|---|---|---|---|---|---|---|---|---|---|---|---|---|
| M-1 |  | X | X |  | X |  |  |  | — | — | X | — | X | — | YES |
| M-2 |  | X | X |  |  | X |  |  | — | X | X | — | OR | OR | YES |
| M-3 |  | X | X | X |  |  |  |  | — | — | X | — | OR | OR | YES |
| M-4 |  |  | X | X |  | X | X |  | X | — | OR | OR | OR | OR | YES |
| 1ST |  |  | X |  |  |  |  |  | — | — | X | X | X | OR |  |
| 2ND |  |  | X |  |  | X |  |  | — | — | X | OR | OR | OR | NO |
| 3RD |  |  | X | X |  |  |  |  | — | — | X | OR | OR | OR | NO |
| 4TH |  |  | X | X |  |  | X |  | X | OR | OR | OR | OR | OR | NO |
| 5TH |  |  | X | X |  |  | X | X | OR | OR | OR | OR | OR | OR | YES |
| REV. | X |  |  |  | X |  |  |  | — | — | — | — | — | — | YES |

| GEAR | RC 122 | CC 106 | FC 92 | DC 74 | L/R 164 | 2B 264 | 4B 256 | 5B 162 | OWC4 254 DR | OWC4 254 CO | OWC3 252 DR | OWC3 252 CO | OWC2 116 DR | OWC2 116 CO | OWC1 174 DR | OWC1 174 CO |
|---|---|---|---|---|---|---|---|---|---|---|---|---|---|---|---|---|
| M-1 |  | X | X |  | X |  |  |  | — | — | — | — | X | — | X | — |
| M-2 |  | X | X |  |  | X | X |  | X | — | — | X | X | — | OR | OR |
| M-3 |  | X | X | X |  | X |  |  | OR | OR | — | — | OR | — | OR | OR |
| M-4 |  |  | X | X |  | X |  |  | — | X | X | — | OR | OR | OR | OR |
| 1ST |  |  | X |  |  | X |  |  | — | — | — | — | X | OR | X | OR |
| 2ND |  |  | X | X |  | X |  |  | X | OR | — | — | X | OR | OR | OR |
| 3RD |  |  | X | X |  |  | X |  | OR | OR | — | — | X | OR | OR | OR |
| 4TH |  |  | X | X |  |  | X |  | — | — | X | OR | OR | OR | OR | OR |
| 5TH |  |  | X |  |  |  |  | X | — | — | OR | OR | OR | OR | OR | OR |
| REV. | X |  |  |  | X |  |  |  | — | — | — | — | — | — | — | — |

5,261,862

MULTIPLE SPEED TRANSAXLE FOR AUTOMOTIVE VEHICLES

BACKGROUND OF THE INVENTION

1. Field of the Invention

This invention relates to an automatic transmission of the type used in motor vehicles. The invention pertains more particularly to a transaxle having three planetary gear units whose elements are controlled by overrunning couplings, friction clutches and friction brakes.

2. Description of the Prior Art

Conventional transaxles include a hydrokinetic torque converter and a gearing system disposed coaxially with the torque converter, that axis located parallel to the axis of an axle differential connected by half shafts to the traction wheels of the vehicle. Torque is transferred from the axis of the gearing to the axis of the differential by a drive chain driveably engaged with sprocket wheels, one wheel coaxial with the converter axis, the other wheel coaxial with the differential axis.

In transaxles of this type, it is important that various torque transfer elements be arranged so that they occupy minimal space along the axis on which they are located. The axial spacing is minimized to permit the transaxle to be located in a front wheel drive vehicle, in which the engine and transmission are located in a compartment restricted in the transverse or lateral direction by vehicle styling requirements.

When torque multiplication gearing portions of the transaxle are located on an axis parallel to the axis of the torque converter, packaging considerations are different from those of an arrangement in which the torque transfer elements are located on a common axis with the torque converter and engine. Frequently torque transfer elements are located on the axis of the torque output shaft rather than on the engine crankshaft so that the torque delivery gearing is offset laterally or overlaps the engine crank shaft, thereby reducing the overall axial dimension of the transaxle and engine assembly. When the torque delivery gearing is located on a common axis with the torque converter and engine, this overlapping and offset disposition of the gearing with respect to the engine cannot be accomplished. Thus, the problem of reducing the overall axial dimension of the torque converter and gearing, friction clutches, friction brakes and overrunning couplings requires an alternate solution.

In transaxles of this type wherein a chain drive mechanism is used to transfer torque between parallel axis, the drive chain is located between the torque multiplication gearing and the torque converter. This arrangement unnecessarily increases the overall dimension of the transaction and engine assembly. This shortcoming in the use of available space virtually precludes use of a third planetary gear set that might be used to produce a fifth forward speed ratio.

U.S Pat. No. 4,938,097 describes a transaxle having two planetory gear units for producing forward speed ratios and a reverse drive ratio. One of the planetary gear units is nested within the space defined by a sprocket wheel, engaged by a drive chain that transmits torque from the axis of the gearing to the axis of a differential mechanism.

SUMMARY OF THE INVENTION

In overcoming the packaging difficulties associated with arranging the gearing and control elements in a transaxle whose axis is parallel to the transverse axis of a motor vehicle, my invention includes three simple planetary gear units spaced mutually along the transverse axis. Each gear unit includes a sun gear, a ring gear, a carrier and a set of planetary pinions, supported rotatably on the carrier and meshing continually with the sun gear and ring gear. One of the gear units occupies a space surrounded by a sprocket wheel engaged by a drive train that transmits torque from the axis of the gearing to a parallel axis, about which the output gearing and the differential mechanism are centered. Because the sprocket wheel overlaps the space occupied by this gear unit, there is a substantial savings in the dimension along the transverse axis required to package the gearing and control elements.

The transaxle produces five forward speed ratios, two underdrive ratios, a direct drive and two overdrive ratios and reverse speed ratio. In one embodiment of the invention, all of the gear shifts are nonsynchronous; in another embodiment, one of the upshifts is a synchronous gear shift.

The carrier of the third planetary gear unit is held by a selectively actuated brake and the sun gear of that gear unit is driven so that the ring gear drives the sun gear of the second gear unit in reverse direction so that the output speed of the sprocket is slower than it is for the fourth speed ratio, in which the sun gear of the second gear unit is held against rotation by engagement of a brake band.

In one embodiment of the invention the ring gear of the third gear unit supports a common inner race of two overrunning couplings whose outer races are held against rotation on the transmission housing through operation of two friction brakes.

BRIEF DESCRIPTION OF THE DRAWINGS

FIG. 2 is a schematic diagram of the transaxle assembly of FIGS. 1A and 1B.

DESCRIPTION OF THE PREFERRED EMBODIMENT

Torque Converter

Figure 1A:
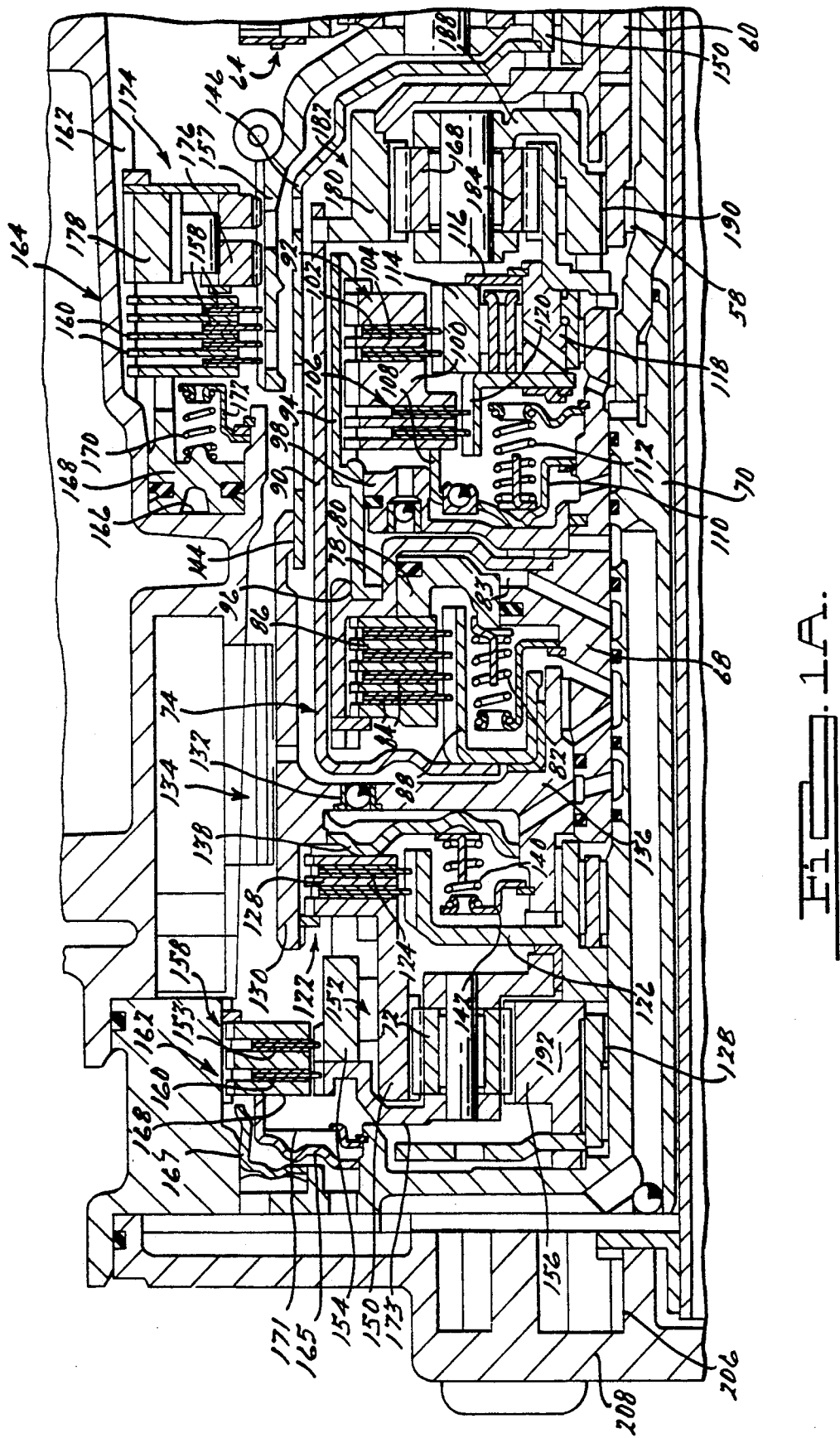
FIGS 1A and 1B taken together is a cross section of an assembly of an automatic transaxle according to my invention taken at a plane containing the longitudinal axis.
Figure 1B:
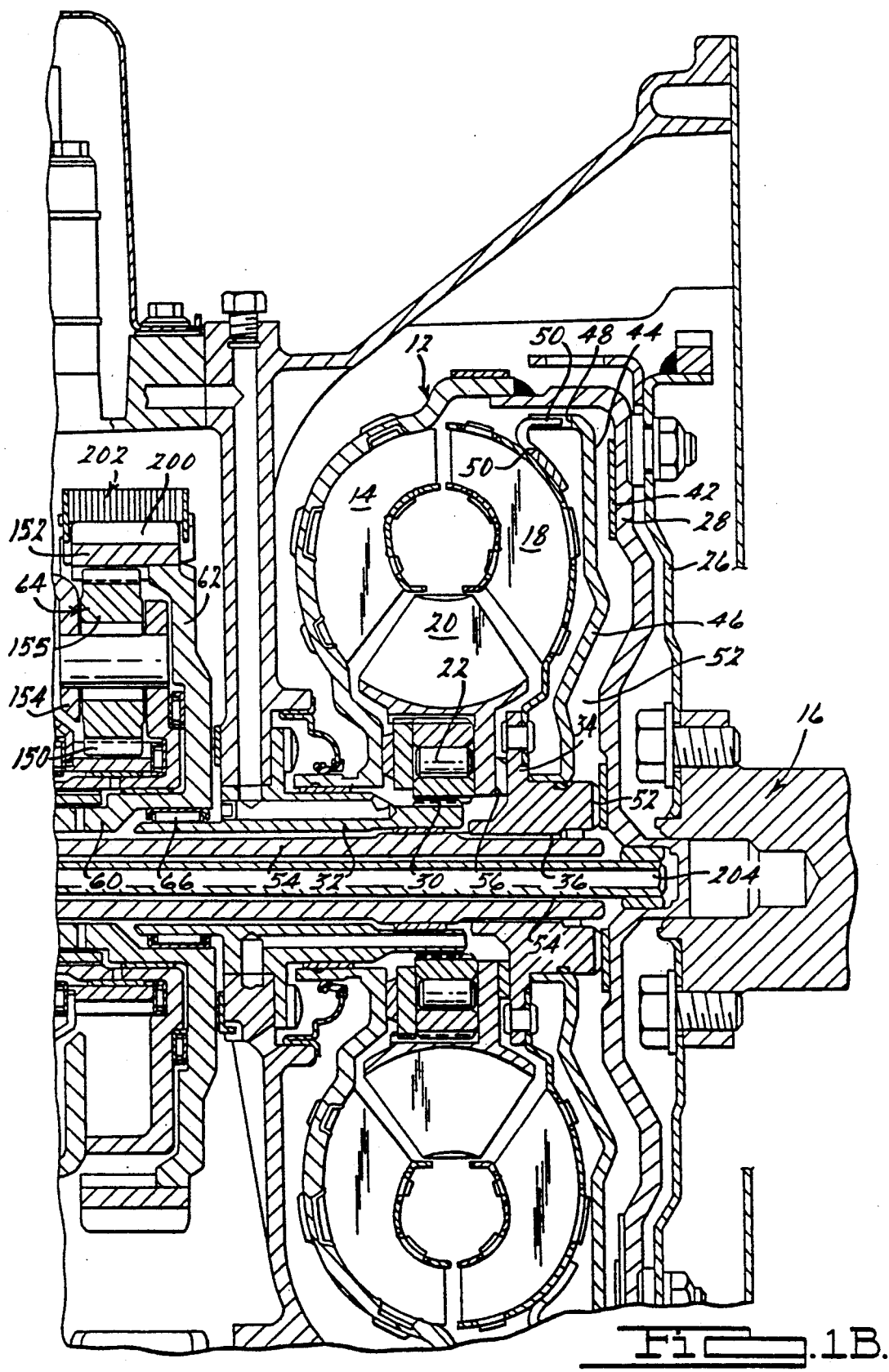

The transaxle includes a torque converter 12 having a bladed impeller wheel 14, driveably connected to the crankshaft 16 of an internal combustion engine; a bladed turbine wheel 18, hydrokinetically driven from the impeller; and a bladed stator 20 wheel, located in a torodial flow path between the exit section of the turbine and the entrance section of the impeller. The stator is supported on an overrunning coupling 22, which produces a one-way drive connection between the stator wheel and the transmission housing 24. The housing comprises several bolted portions including a torque converter housing and a gearset housing.

Crankshaft 16 is connected by disc blades 26 to the radially outer portion of an impeller housing wall 28 welded to an impeller shroud, thereby forming a driving connection between the crankshaft and the impeller. The inner race of one-way coupling 22 is splined at 30 to a stationary sleeve shaft 32.

Turbine 18 includes an outer shroud, which carries radial inflow blades and a hub 34, to which the turbine shroud is secured by rivets. Turbine hub 34 is splined at 36 to a turbine sleeve shaft 54, which is supported rotatably on a journal connection in the stationary sleeve shaft 32. A clutch plate 40 is formed with a central opening and is supported by turbine hub 34. It is adapted to slide on the hub in response to the force of pressure in the torus circuit of the torque converter.

A friction disc 42, secured to the radially outward surface of the impeller housing wall 28, adapted to be engaged by an annular surface 44 located on piston plate 46 when that plate moves rightward toward disc 42. The radially outer margin of piston plate 46 has a series of recesses 48, in which are received driving flanges formed on an angle 50 secured by a weldment to the outer surface of the turbine shroud.

Control pressure is distributed to a pressure cavity 52 bounded by piston plate 46 and the adjacent impeller wall 28. Pressure is distributed to the pressure cavity through radial ports 52 located in the turbine hub 34. Those ports communicate with annular control pressure passage 54, which receives control pressure from internal porting that communicates with a control valve body.

Flanges 50 are slideably connected to the outer periphery of the piston plate 46. By controlling pressure in cavity 52, the clutch engaging force can be controlled by establishing a modulated pressure in cavity 52 by means of a valve circuit under control of a microprocessor that responds to engine torque signals, signals that determined gear ratio, a vehicle speed signal, and other variables. The pressure in cavity 52 is regulated to permit a controlled degree of slip at the engaging friction surfaces of disc 42 and friction surface 44.

A portion of the torque transmitted from the engine crankshaft to the turbine shaft or input shaft 54 is delivered mechanically in parallel relation with respect to the hydrokinetic torque delivery path through the torque converter whenever the torque converter clutch plate 46 is in a partially engaged condition. Fluid that is distributed under pressure to cavity 54 circulates radially outward into the torus circuit and through radial flow passage 56.

Input shaft 54 is supported at its left end by bearing 58 located in the hub 60 of chain support 62, which extends radially outward between an interior wall of the transmission casing and a planetary gear unit 64. Sleeve 60 is supported by bearing 66, which is mounted on the stator sleeve shaft 32.

Clutch and Brake Assembly

The left-hand end of input shaft 54 is splined to clutch sleeve 68, which is rotatably supported by stationary sleeve 70, an extension of or integrally formed with end wall 72 of the transmission housing.

A direct clutch, generally identified by reference number 74 has a clutch cylinder 178, which is welded to clutch 68. Clutch cylinder 78 forms an annular piston cavity in which is located a piston 80. A piston return spring assembly 82 includes a spring cage secured by a snap ring to clutch sleeve 68. The spring assembly includes multiple compression springs that apply a return spring force to piston 80.

When the piston is stroked, pressure is distributed to pressure chamber 83. The clutch disc 84 and separator plates 86 are brought into frictional engagement, thereby establishing a drive connection between cylinder 78 and externally splined clutch element 88, which is secured to torque transfer shell 90.

A forward clutch, generally identified by reference number 92, comprises a clutch cylinder 94, is secured by a weldment at 96 to clutch cylinder 78. Cylinder 94 and clutch sleeve 68 together define a clutch pressure chamber containing annular piston 98. An annular extension 100 is carried by piston 98. Forward clutch 92 includes clutch disc 102 and spacer plates 104, which are brought into frictional engagement mutually when pressure plate 100 is acted upon by piston 98 upon introduction of clutch pressure to the annular cylinder pressure chamber.

A friction coast clutch generally identified by reference number 106 includes an annular cylinder 108 and alternately positioned clutch discs and spacer plates located adjacent pressure plate 100 of forward clutch 92. Located in the cylinder 108 is a coast clutch annular piston 110. A set of springs 112 urges piston 110 toward a release position. Spring set 112 has a base plate, which is anchored by a snap ring on clutch sleeve 68.

Piston 110 engages the disc and separator plate assembly of coast clutch 106 when pressure is applied to the pressure chamber defined by cylinder 108 and piston 110.

The discs and separator plates of coast clutch 106 are apertured to permit extensions carried by piston 98 to extend therethrough so that piston 98 acts on pressure plate 110 of the forward clutch 92. This allows the forward clutch and coast clutch to be applied selectively or in tandem.

Discs 102 of forward clutch 92 are splined to the outer race 114 of overrunning clutch 116. Inner race 118 of clutch 116 is connected directly to clutch element 120 of the coast clutch 106, to which the discs of the coast clutch are splined.

A reverse clutch, generally identified by reference number 122, includes multiple friction discs 124, which are splined to brake element 126, and separator plate 128. Brake element 126 is splined at 128 to the clutch sleeve 68.

Reverse clutch 122 includes an annular cylinder 130 formed in brake drum 132, which is surrounded by a 2B brake band assembly 134. Brake drum 130 includes a hub 136 journaled on clutch sleeve 68 and on brake element 126. A brake piston 136 is disposed in cylinder 130. When actuating pressure is supplied to the working chamber defined by piston 136 and cylinder 130, piston 190 applies an engaging force of the reverse clutch 122, thereby establishing a drive connection between brake drum 130 and clutch element 126.

A spring assembly comprising multiple compression springs 140 and a supporting cage 142 is anchored by a snap ring on the hub 136 of brake drum 130. The spring assembly urges the piston 138 to the disengaged position.

The 2B brake band assembly 134 includes a brake band that is applied by a fluid pressure operated servo, similar to the servos described in U.S. Pat. No. 4,347,765, the entire disclosure of which is herein incorporated by reference. Brake drum 130 is splined at 144 to a torque transfer member 146, a stamping.

The outer surface of ring gear 150 forms the inner race of a third one-way coupling, generally identified by reference number 152. The outer race 154 of coupling 152 is splined to a friction disc 153 of 4B brake carrier 172, generally identified by reference number 158, and is splined to the friction disc 160 of a 5B brake, generally identified by the reference number 162. The separator plates associated with brakes 158 and 162 are fixed to the transmission casing 24 by splined connections.

Brake 162 is located in the cylinder defined by the inner local surface of transmission housing and includes hydraulic piston 165, which is urged by hydraulic pressure into contact with the spacer plate of clutch 162. Brake 158 includes hydraulic piston 167; which extends through an aperture a spacer plate of brake 16 and is maintained in contact with the spacer plates of brake 158 when hydraulic pressure is admitted to the cylinder of brakes 158 and 162 from behind piston 166. A bevel spring 170 urges pistons 165, 166, and 167 away from contact with the spacer plates of the corresponding friction brakes. Brakes 158 and 162 can be engaged in tandem by pressurizing the brake cylinder behind pistons 166 and 164 or those brakes can be applied individually by pressurizing only the pressure chamber behind one of the pistons.

Brake 162 operates to connect carrier 172 of a third planetary gear unit to the transmission casing directly, whereas ring gear 150 is fixed against rotation by brake 158 through operation of one-way coupling 152.

A low/reverse brake, generally identified by reference number 164, includes brake discs 158, spacer plates 160, annular cylinder 166 formed in the transmission housing, annular piston 168, multiple compression springs 170, and plate 172 anchored by a snap ring on the transmission housing. The compression springs and plate operate to urge piston 168 in the left-hand direction and hydraulic pressure, admitted to cylinder 166, moves piston 168 rightward, thereby forcing the discs and the stator into a drive connection and holding brake element 157 against rotation on the transmission housing.

Low/reverse brake 164 is arranged in parallel with respect to an overrunning coupling 174, which includes an inner race 176 connected to brake element 157 and an outer race 178 secured to the transmission housing. Rollers of the overrunning coupling are located between the inner race and outer race of coupling 174.

Speed Reduction Gearing

Carrier 154 is driveably connected to ring gear 180, an element of the first planetary gear set generally identified by reference number 182. Ring gear 180 is connected to direct clutch 74 through torque transfer member 90.

In addition to ring gear 180, the first planetary gear unit 182 includes a sun gear 184, connected directly to the inner race 118 of overrunning coupling 160 and to clutch element 120 of coast clutch 106. A set of planetary pinions 168, in continual meshing engagement with ring gear 180 and sun gear 184, is supported rotatably on carrier 188, which is splined to the hub 60 of a drive chain mechanism.

The third planetary gear unit 156 includes ring gear 150, sun gear 192, planet pinion carrier 173, and a set of planet pinions 72 rotatably supported on carrier 72 in continuous meshing engagement with ring gear 150 and sun gear 192. Sun gear 192 is driveably connected by brake element 126 to reverse clutch 122 and to the clutch cylinder 94 of coast clutch 106 and forward clutch 92 through a spline connection of those members.

The first planetary gear unit 64 includes a sun gear 150, welded to torque transfer member 146; ring gear 152; planet carrier 154; and a set of planet pinions 155 rotatably supported on carrier 154 and in continual meshing engagement with ring gear 152 and sun gear 150. Carrier 154 is connected directly to brake member 157, which extends over the torque transfer member 146. Member 157 externally splined to provide a driving connection with internally splined brake discs 158, each of which is located between a brake separator plate 160, secured in a key way 162 formed on the interior of the transmission housing.

Chain Drive Mechanism

Connected to the outer periphery of ring gear 152 is a sprocket wheel 200 having sprocket teeth engaged by drive chain 202. The drive chain is located axially approximately in the radial plane of planetary gear unit 64. It requires no additional axial space in the assembly. It serves as a torque output element of the planetary gear units 64, 182 and 156. By arranging the torque transfer drive chain 202 in this matter and by arranging the clutches and brakes on the side of the gearing opposite the hydrokinetic torque converter 12, a compact overall construction is achieved with minimal axial space requirement and without compromising torque capacity of the transmission. The arrangement of the clutches and brake with respect to the gear and with respect to the hydrokinetic torque converter is accomplished through the use of turbine sleeve shaft 38. This shaft surrounds the front drive shaft 204, which is connected at its right-hand end to the engine crankshaft 16 and at its left-hand end to the rotor of a positive displacement pump 206, located at the left-hand side of the transmission housing. Pump 252 includes gear elements therein enclosed by pump housing 208 secured to the left-hand side of the transmission housing. The pump serves as a pressure source for the control system and for the clutches and brakes.

Output Gearing

Drive chain 202 is driveably connected to sprocket 210, shown in FIG. 2. Sprocket 210 is secured to the hub of sun gear 212, which forms part of the final drive gear unit that includes ring gear 214, carrier 216, and a set of planetary pinions 218 rotatably supported on the carrier in continuous meshing engagement with sun gear 212 and stationary ring gear 214. Carrier 216 is connected to differential carrier 220. These carriers are supported rotatably on the transmission housing.

The differential mechanism includes differential bevel pinions 222, 224, which are in continuous meshing engagement with side bevel gears 226, 228. Each side bevel gear is splined to a constant velocity universal joint 230, 232 which transmits power from the differential to axial shafts 234, 236 that extend laterally outwardly from the constant velocity joints to the drive wheels of the vehicle. FIG. 1C of U.S. Pat. No. 9,338,097 shows details of the differential mechanism, the final drive gear set and the driven sprocket 210. The entire disclosure of the '097 patent is incorporated herein by reference.

Mode of Operation

Figure 3:
FIG. 3 is a chart that shows the engaged and disengaged state of the friction clutches and the driving and overrunning state of one-way couplings that control operation of the transaxle of FIGS. 1A and 1B.

FIG. 2 shows in schematic form the principle elements of the gearing clutches, brakes, final drive gearing and torque converter. FIG. 3 contains a schedule of the engaged/disengaged state of various friction clutches and brakes and the state of the overrunning couplings. In FIG. 3, a 37 X" represents an element that transmits torque, a "-" represents an element that transmits no torque because there is no relative notation between the races of the one-way couplings, and "OR" represents an overrunning coupling.

For continuous operation in the low drive range, the transmission may be conditioned for torque delivery in either direction, in which case a low/reverse brake 164 is applied. Forward clutch 92 is engaged during each of the forward drive ratios.

Whether the gear ratios are selected manually to produce the M1-M4 ranges or automatically to produce the forward ratios in the automatic mode of operation, engagement of forward clutch 92 produces a driveable connection through one-way coupling 116 between input shaft 54 and sun gear 184. One-way brake 174 holds carrier 154 and ring gear 180 against rotation. By fixing these to the transmission housing the output of gear set 182 is through carrier 188, which drives ring gear 154 of gearset 64 and sprocket wheel 200, to which it is attached.

When a first speed ratio is selected manually by moving the gear selector to the M1 range, coast clutch 106 and low/reverse clutch 160 are engaged, thereby producing second torque delivery paths between input shaft 54 and sun gear 184 and between the transmission housing and carrier 154. The coast clutch bypasses the torque delivery path through forward clutch 92 and one-way clutch 116; the low/reverse clutch bypasses one-way coupling 174 so that engine braking is available in the M1 range.

To produce the second speed ratio automatically, the 2B brake band 134 is engaged in addition to the forward clutch. One-way coupling 174 overruns in a second speed ratio but one-way coupling 116 drives. In this way, input shaft 54 is connected through forward clutch 92 and one-way coupling 116 to drive sun gear 184 and sun gear 150 is held against rotation on the transmission housing by engagement of 2B brake 134. The output is taken at ring gear 152, which drives sprocket wheel 200. There is no engine braking during a coast condition in the second speed automatic range.

When the second speed ratio is selected manually by moving the gear selector to the M2 range, the coast clutch and 2B brake band are engaged, one-way coupling 116 drives and coupling 174 overruns. In a drive condition, the gear sets operate as described with respect to the second speed in the automatic range. However, during a coast condition one-way coupling 116 does not drive so the torque delivery path between sun gear 184 and input shaft 54 is through the coast clutch 106.

The 2-3 upshift in the automatic range is a synchronous shift accomplished by disengaging 2B brake 134 and engaging direct clutch 70. When this occurs, coupling 116 drives and the other one-way couplings are either inactive or overrun. Input shaft 54 is connected by the friction clutch and one-way clutch 184 to sun gear 184, and the direct clutch connects the input shaft to ring gear 180. Therefore, carrier 188, ring gear 152 and sprocket wheel 200 turn in the same direction and at the same speed as the input shaft. To produce a third speed ratio manually, coast clutch 106 is engaged in addition to the clutches that are engaged to produce a third speed ratio automatically. Engagement of the coast clutch provides engine braking during a coast condition when one-way clutch 186 disables the torque delivery path through forward clutch 92.

The fourth speed ratio is produced in the automatic mode by engaging the 4B brake 152 while the direct clutch and forward clutch are engaged. In this condition, couplings 116, 174 and 156 overrun, except during a drive condition when coupling 156 completes a torque delivery path between sun gear 150 and the transmission housing. Input shaft 154 is connected through the direct clutch to ring gear 180 and carrier 154 of gear set 64. With sun gear 150 held against rotation, the output is taken on ring gear 152 and sprocket wheel 200.

To select the fourth speed ratio manually, 2B brake 134, 4B brake 156, forward clutch 92 and direct clutch 74 are engaged. The status of these brakes and clutches operates to hold sun gear 150 fixed against rotation on the transmission housing and to connect carrier 154 to input shaft 54 through direct clutch 74. The output is taken at ring gear 152 and sprocket wheel 200. However, in a coast condition with the transmission operating in the M4 range, although coupling 156 is inoperative and therefore unable to connect sun gear 150 to the transmission housing, 2B brake 134 provides the gear set reaction and engine brake is available.

The fifth speed ratio in the automatic mode results by engaging 5B brake 162 in addition to the brakes and clutches that are engaged to produce the fourth speed ratio. After this occurs, all of the one-way couplings 116, 156 and 174 overrun in both the drive and coast conditions. Input shaft 54 drives sun gear 192 of the third gear unit 156 and carrier 172 is held against rotation by 5B brake 162. Output from that gear set is taken at ring gear 150, which drives sun gear 150 of the second gear unit 64. Carrier 154 turns at the speed of the input shaft 54 through operation of direct clutch 74 and the output is taken at ring gear 152 and sprocket wheel 200. Engine braking is therefore available during coast conditions in the fifth speed automatic range.

To produce reverse drive, reverse clutch 122 and low/reverse brake 164 are engaged. Sun gear 150 is driven at the speed of input shaft 54 through the reverse clutch and carrier 154 is held against rotation through engagement of the low/reverse brake. The output is taken at ring gear 152 and sprocket wheel 200. The gear set reaction is continually available to provide engine braking in drive and coast conditions in the reverse range.

Figure 4:
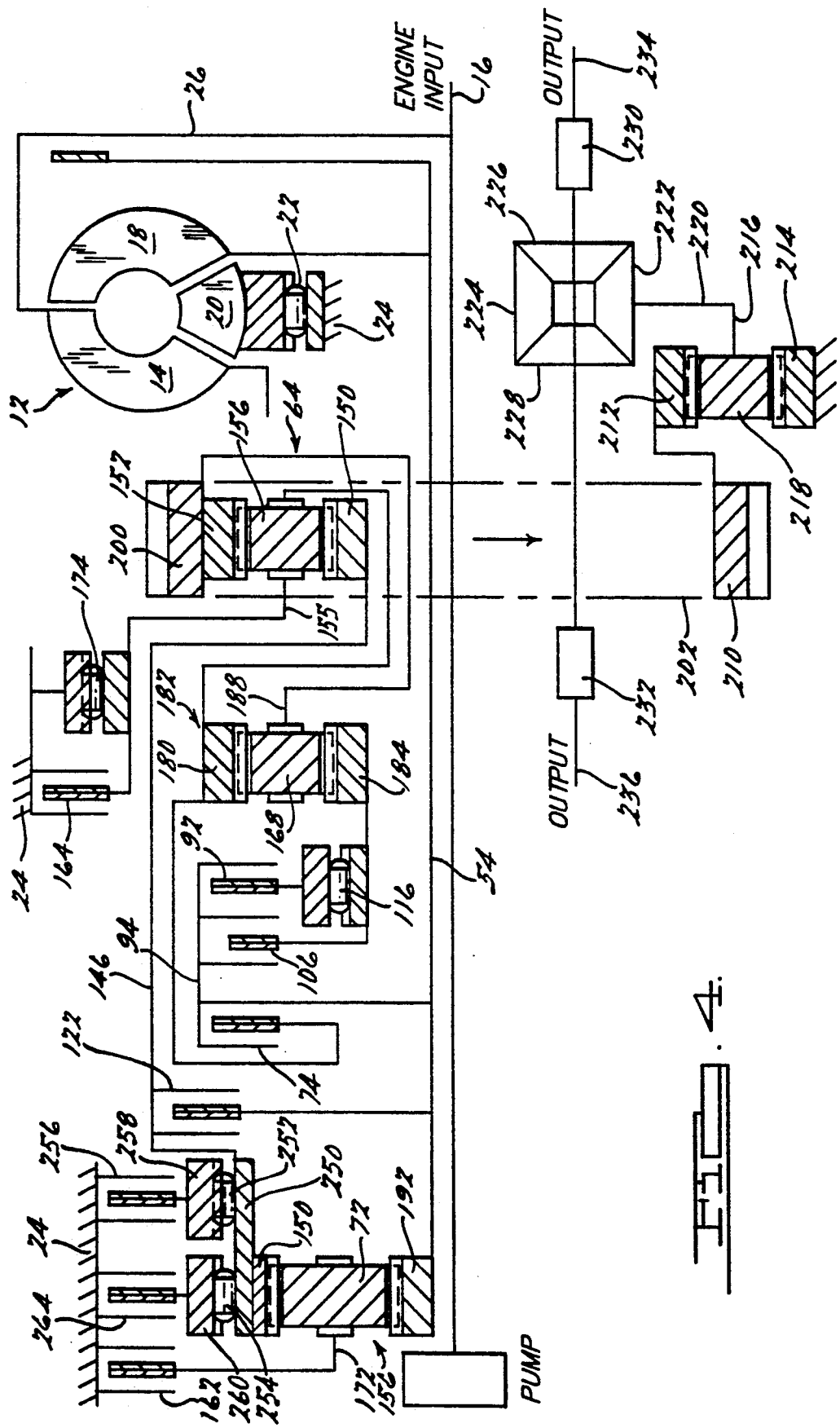
FIG. 4 is a schematic diagram of a transaxle according to my invention in which the control elements associated with one of the gear units are modified somewhat from the transaxle of FIG. 2.

Referring now to FIG. 4 the transmission shown there is substantially the same as that of FIG. 2 except with regard to the connection between ring gear 150 of the third planetary gear unit 156 and the location of 2B brake 134.

In FIG. 4, the inner races of one-way couplings 252 and 254 are joined mechanically to the outer surface of ring gear 150. The outer race of coupling 252 is connected to an element of 4B clutch 256, which is adapted to hold the outer race 258 against rotation on the transmission housing 24. Similarly, the outer race 40 of overrunning coupling 254 is connected to an element of a 2B clutch 264, adapted to hold outer race 260 against rotation on the transmission housing.

Figure 5:
FIG. 5 is a chart that shows the engaged and disengaged state of the friction clutches and the driving and overrunning state of one-way couplings that control operation of the transaxle of FIG. 4.

The schedule of FIG. 5 shows a similar schedule to that of FIG. 3 of the engaged and disengaged states of the various friction clutches and brakes and the driving and overrunning states of the one-way couplings. A principal difference between the schedule of FIG. 5 and that of FIG. 3 is with respect to the second and third speed ratios in the automatic and manual ranges and the addition of a fourth overrunning coupling 254.

In the second speed ratio in the automatic range, the gearset and reaction is provided by engaging 2B clutch 264, which holds sun gear 150 against rotation on the transmission housing through one-way coupling 254. The input shaft drives sun gear 184 through forward clutch 92 and one-way coupling 116 and the output is taken at ring gear 152 and sprocket wheel 200.

The second speed ratio in the manual range results by engaging coast clutch 106, forward clutch 92, 2B brake 264 and 4B brake 256. The gearset reaction in a drive condition is provided by holding sun gear 150 against rotation on the transmission housing through operation of one-way clutch 254 and the 2B brake. The gearset reaction in a coast condition is provided by holding sun gear 150 on the transmission housing through operation of coupling 252 and the 4B brake. Therefore, engine braking is available in a coast and drive condition due to the parallel arrangement of couplings 254 and 252 located between ring gear 150 and the transmission housing 24.

To produce a synchronous shift between the second speed and the third speed ratio in the automatic mode, direct clutch 74 is applied in addition to the friction elements (forward clutch 92 and 2B brake 264) that are applied to produce the second speed ratio. Coupling 254 overruns and coupling 252 does not drive in both the drive and coast conditions in the third speed ratio. Therefore sun gear 184 is connected to input shaft 54 through forward clutch 92 and one-way coupling 116. Ring gear 180 is connected to the input shaft through direct clutch 74, and carrier 188, ring gear 152 and sprocket 200 are driven at the same speed and in the same direction as input shaft 54. There is no coast braking in the third speed ratio automatic range.

However, when the third speed ratio is selected manually, in addition to the clutches and brakes that are engaged to produce the third speed automatic range coast clutch 106 is also engaged. Couplings 174 and 254 overrun in drive and coast conditions, coupling 252 transmits no torque. Coupling 116 transmits no torque during a coast condition and drives in the drive condition. Ring gear 190 is driven through the direct clutch from the input shaft, sun gear 184 is driven through the forward clutch and coast clutch, and carrier 188, ring gear 152 and sprocket 220 turn at the same speed and in the same direction as input shaft 54. However during coast conditions, although coupling 116 transmits no torque, there is nonetheless a direct drive connection between sun gear 184 and input shaft 54 through coast clutch 106. Therefore, engine braking is available in the third speed ratio manual range.

I claim:

1. A multiple speed ratio automatic transaxle for an automotive vehicle having a power source for driving a load, comprising:
   input means for driveably connecting the power source and the transaxle;
   output means for driveably connecting the transaxle and the load;
   a planetary gear system comprising first, second and third planetary gear units, each gear unit having a sun gear, a ring gear, planet pinions meshing with the sun gear and ring gear, and a carrier rotatably supporting the planet pinions, the carrier of the second gear unit being connected driveably to the ring gear of the first gear unit, the carrier of the first gear unit being connected driveably to the ring gear of the third gear unit and the output means, the sun gear of the second gear unit being connected driveably to the ring gear of the third gear unit, the sun gear of the third gear unit being connected driveably to the input means;
   first clutch means for driveably connecting and disconnecting the sun gear of the first gear unit and the input means;
   second clutch means for driveably connecting and disconnecting the ring gear of the first gear unit and the input means;
   third clutch means for driveably connecting and disconnecting the input means to and from the ring gear of the third gear unit and the sun gear of the second gear unit;
   first brake means for holding and releasing the carrier of the second gear unit and ring gear of the first gear unit;
   second brake means for holding and releasing the ring gear of the third gear unit and the sun gear of the second gear unit;
   third brake means for holding and releasing the ring gear of the third gear unit and the sun gear of the second gear unit; and
   fourth brake means for holding and releasing the carrier of the third gear unit.

2. The transmission of claim 1 wherein the first brake means comprises:
   first overrunning coupling means for producing a one-way drive connection between the carrier of the second gear unit and a rotatably fixed surface; and
   a first friction brake arranged in parallel with said first overrunning coupling between the carrier of the second gear unit and said rotatably fixed surface.

3. The transmission of claim 1 wherein the first clutch means comprises:
   a first friction clutch driveably connected to the input means;
   second overrunning coupling means, disposed in series with the second clutch, for producing a one-way drive connection between the sun gear of the first gear unit and the second clutch.

4. The transmission of claim 3 wherein the first clutch means further comprises a coast clutch arranged in parallel with said second overrunning coupling and the first friction clutch between the input means and the sun gear of the first gear unit.

5. The transmission of claim 1 wherein the second brake means comprises:
   a brake drum driveably connected to the ring gear of the third gear unit and the sun gear of the second gear unit; and
   brake band means for holding against rotation and releasing the brake drum.

6. The transmission of claim 1 wherein the third brake means comprises:
   a second friction brake; and
   second overrunning coupling means, disposed in series with the second friction brake, for producing a one-way drive connection between the ring gear of the third gear unit and a rotatably fixed surface.

7. The transmission of claim 1 further comprising:
a torque converter having an impeller driveably connected to the power source; and
a turbine hydrokinetically coupled to the impeller and driveably connected to the input means.

8. The transmission of claim 7 wherein the output means further comprises:
final drive gearing driveably connected to the load;
a driving element located substantially in the transverse plane of the gear unit that is most proximate to said torque converter, mounted on the axis of said gear unit, and driveably connected to an element of said gear unit; and
a driven element driveably connected to the final drive gearing.

9. An automatic transmission for an automotive vehicle comprising:
an input shaft;
an output shaft disposed parallel to the input shaft;
a planetary gear system comprising first, second and third planetary gear units, each gear unit having a sun gear, a ring gear, planet pinions meshing with the sun gear and ring gear, and a carrier rotatably supporting the planet pinions, the output means being connected driveably to the ring gear of the second gear unit and to the carrier of the first gear unit, the carrier of the second gear unit being connected driveably to the ring gear of the first gear unit, the carrier of the first gear unit being connected driveably to the ring gear of the third gear unit and the output shaft, the sun gear of the second gear unit being connected driveably to the ring gear of the third gear unit, the sun gear of the third gear unit being connected driveably to the input shaft;
first clutch means for driveably connecting and disconnecting the sun gear of the first gear unit and the input means;
second clutch means for driveably connecting and disconnecting the ring gear of the first gear unit and the input shaft;
third clutch means for driveably connecting and disconnecting the input means to and from the ring gear of the third gear unit and the sun gear of the second gear unit;
first brake means for holding and releasing the carrier of the second gear unit and ring gear of the first gear unit;
second brake means for holding and releasing the ring gear of the third gear unit;
third brake means for holding and releasing the ring gear of the third gear unit; and
fourth brake means for holding and releasing the carrier of the third gear unit.

10. The transmission of claim 9 wherein the first brake means comprises:
first overrunning coupling means for producing a one-way drive connection between the carrier of the second gear unit and a rotatably fixed surface; and
a first friction brake arranged in parallel with said first overrunning coupling between the carrier of the second gear unit and said rotatably fixed surface.

11. The transmission of claim 9 wherein the first clutch means comprises:
a first friction clutch driveably connected to the input shaft; and
second overrunning coupling means, disposed in series with the first friction clutch, for producing a one-way drive connection between the sun gear of the first gear unit and the second clutch.

12. The transmission of claim 9 wherein the first clutch means further comprises a coast clutch arranged in parallel with said second overrunning coupling and the first friction clutch, located between the input shaft and the sun gear of the first gear unit.

13. The transmission of claim 9 wherein the second brake means comprises:
a second friction brake; and
second overrunning coupling means, disposed in series with the second friction brake, for producing a one-way drive connection between the ring gear of the third gear unit and a rotatably fixed surface.

14. The transmission of claim 9 wherein the third brake means comprises:
a third friction brake; and
third overrunning coupling means, disposed in series with the second friction brake, for producing a one-way drive connection between the ring gear of the third gear unit and a rotatably fixed surface.

15. The transmission of claim 9 wherein:
the second brake means includes a second friction brake and a second overrunning coupling means disposed in series with the second friction brake, and
the third brake means includes a third friction brake and a third overrunning coupling means disposed in series with the second friction brake, the second overrunning coupling means and third overrunning coupling means having a first race driveably connected to the ring gear of the third gear unit, the second overrunning coupling means having a second race driveably connected to the second friction brake, the third overrunning coupling means having a third race driveably connected to the third friction brake.

16. The transmission of claim 9 further comprising:
a torque converter having an impeller driveably connectable to a power source; and
a turbine hydrokinetically coupled to the impeller and driveably connected to the input shaft.

17. The transmission of claim 9 further comprising an output drive including;
final drive gearing driveably connected to the load;
a driving element located substantially in the transverse plane of the gear unit that is most proximate to said torque converter, mounted on the axis of said gear unit, and driveably connected to an element of said gear unit; and
a driven element driveably connected to the final drive gearing.

* * * * *